United States Patent
Nyström

(10) Patent No.: US 9,203,620 B1
(45) Date of Patent: Dec. 1, 2015

(54) SYSTEM, METHOD AND APPARATUS FOR SECURE USE OF CRYPTOGRAPHIC CREDENTIALS IN MOBILE DEVICES

(75) Inventor: Magnus Nyström, Vallentuna (SE)

(73) Assignee: EMC Corporation, Hopkinton, MA (US)

( * ) Notice: Subject to any disclaimer, the term of this patent is extended or adjusted under 35 U.S.C. 154(b) by 2065 days.

(21) Appl. No.: 12/360,872

(22) Filed: Jan. 28, 2009

Related U.S. Application Data

(60) Provisional application No. 61/023,967, filed on Jan. 28, 2008.

(51) Int. Cl.
- G06F 7/04 (2006.01)
- G06F 17/30 (2006.01)
- H04L 9/08 (2006.01)
- H04L 9/32 (2006.01)

(52) U.S. Cl.
CPC ............... *H04L 9/0894* (2013.01); *H04L 9/32* (2013.01)

(58) Field of Classification Search
CPC .................. H04L 9/0894; H04L 9/32
USPC ............................................. 726/2
See application file for complete search history.

(56) References Cited

U.S. PATENT DOCUMENTS

| | | | |
|---|---|---|---|
| 4,720,860 A | 1/1988 | Weiss | |
| 5,168,520 A | 12/1992 | Weiss | |
| 5,361,062 A | 11/1994 | Weiss et al. | |
| 5,491,752 A | 2/1996 | Kaufman et al. | |
| 5,721,779 A | 2/1998 | Funk | |
| 6,795,923 B1 * | 9/2004 | Stern et al. | 726/12 |
| 6,901,512 B2 * | 5/2005 | Kurn et al. | 713/164 |
| 7,111,172 B1 | 9/2006 | Duane et al. | |
| 7,171,558 B1 * | 1/2007 | Mourad et al. | 713/168 |

(Continued)

FOREIGN PATENT DOCUMENTS

WO WO2006014358 2/2006

OTHER PUBLICATIONS

M. Nystrom, "Cryptographic Token Key Initialization Protocol (CT-KIP)," IETF RFC 4758, Nov. 2006.

(Continued)

*Primary Examiner* — Dant Shaifer Harriman
(74) *Attorney, Agent, or Firm* — Ryan, Mason & Lewis, LLP

(57) ABSTRACT

A mobile telephone or other type of mobile communication device is configured to store a cryptographic credential within a secure hardware environment of the device. A script is provisioned for execution in the mobile communication device, the script comprising program code that executes at least in part within the secure hardware environment and is configured to utilize the cryptographic credential stored within the secure hardware environment. Prior to permitting the script to access the cryptographic credential, the secure hardware environment verifies an endorsement of the script. The endorsement may be provided by an issuer of the cryptographic credential. The cryptographic credential stored in the secure hardware environment may comprise a long-term credential and the script may be configured to generate a plurality of short-lived credentials based on the long-term credential. More particularly, the script may implement an OTP algorithm so as to provide a software authentication token within the mobile communication device.

24 Claims, 2 Drawing Sheets

(56) References Cited

U.S. PATENT DOCUMENTS

| | | | |
|---|---|---|---|
| 7,743,406 B2 * | 6/2010 | Abedi et al. | 726/2 |
| 7,751,568 B2 * | 7/2010 | Catherman et al. | 380/270 |
| 7,957,532 B2 * | 6/2011 | Chen et al. | 380/270 |
| 8,050,658 B2 * | 11/2011 | Hong | 455/411 |
| 8,064,597 B2 * | 11/2011 | Gehrmann | 380/247 |
| 2001/0055388 A1 | 12/2001 | Kaliski, Jr. | |
| 2004/0030932 A1 | 2/2004 | Juels et al. | |
| 2007/0061566 A1 | 3/2007 | Bailey et al. | |
| 2007/0186105 A1 | 8/2007 | Bailey et al. | |
| 2009/0158032 A1 * | 6/2009 | Costa et al. | 713/156 |
| 2010/0293388 A1 * | 11/2010 | Ammer et al. | 713/187 |

OTHER PUBLICATIONS

U.S. Appl. No. 09/802,485, filed Mar. 9, 2001 and entitled "System and Method for Increasing the Security of Encrypted Secrets and Authentication."

* cited by examiner

SYSTEM, METHOD AND APPARATUS FOR SECURE USE OF CRYPTOGRAPHIC CREDENTIALS IN MOBILE DEVICES

RELATED APPLICATION(S)

The present application claims the priority of U.S. Provisional Patent Application Ser. No. 61/023,967, filed Jan. 28, 2008 and entitled "System, Method and Apparatus for Secure Use of Cryptographic Credentials in Mobile Devices," the disclosure of which is incorporated by reference herein.

FIELD OF THE INVENTION

The present invention relates generally to techniques for providing cryptographic credentials, and algorithms or scripts utilizing those credentials, in mobile communication devices in a network or other type of communication system.

BACKGROUND OF THE INVENTION

Authentication techniques often require that a given user present one-time passwords (OTPs) or other short-lived cryptographic credentials in order to gain access to a protected resource. Such short-lived cryptographic credentials may be generated by an authentication token configured with a long-term base credential, also commonly referred to as a "seed." One particular example of an authentication token is the RSA SecurID® user authentication token, commercially available from RSA, The Security Division of EMC Corporation, of Bedford, Mass., U.S.A.

An authentication token may be a hardware token, typically implemented as a small, hand-held device carried by the user.

Alternatively, an authentication token may be implemented as a software token within a mobile communication device such as a mobile telephone, a laptop computer, a wireless email device, a personal digital assistant (PDA), etc. This type of arrangement is advantageous in that it avoids the need to carry an entirely separate hardware device that is utilized only for authentication purposes. The short-lived cryptographic credentials are typically generated in a secure hardware environment of the mobile communication device, using one or more long-term credentials stored in the secure hardware environment. However, various applications running on the communication device, such as web browsing and email programs, may require use of the cryptographic credentials but run outside of the secure hardware environment. This can be problematic in that malicious software code on the communication device may gain access to any cryptographic credentials that are used by the applications outside of the secure hardware environment.

One possible approach to addressing this problem is to require that any security-sensitive portions of the applications execute in the secure hardware environment. However, this creates additional issues. For example, a secure hardware environment generally cannot support dynamic addition of application programs, also referred to herein as "scripts," which are widely used in customizing mobile communication devices to user preferences. If the secure hardware environment were configured to allow dynamic addition of scripts, it would be easier for an attacker to implant an application that disclosed the cryptographic credentials utilized by other applications.

Accordingly, improved techniques are needed for protecting cryptographic credentials that are generated and stored on mobile communication devices in the presence of dynamic addition of scripts.

SUMMARY OF THE INVENTION

The present invention in one or more of the illustrative embodiments described herein provides enhanced security for cryptographic credentials generated and stored on mobile telephones or other types of mobile communication devices. This enhanced security permits dynamic addition of scripts in a secure manner. It also allows credential issuers to designate which applications may access the credentials.

In one aspect of the invention, a mobile communication device is configured to store a cryptographic credential within a secure hardware environment of the device. A script is provisioned for execution in the mobile communication device, the script comprising program code that executes at least in part within the secure hardware environment and is configured to utilize the cryptographic credential stored within the secure hardware environment. Prior to permitting the script to access the cryptographic credential, the secure hardware environment verifies an endorsement of the script. The endorsement is preferably provided by an issuer of the cryptographic credential.

The mobile communication device may comprise, among other elements, a processor coupled to a memory, with the secure hardware environment being implemented in designated portions of the processor and memory.

In an illustrative embodiment, the script generates short-lived cryptographic credentials based on a long-term cryptographic credential stored in the secure hardware environment. As a more particular example, the script may implement an OTP algorithm so as to provide a software authentication token within the mobile communication device.

In other aspects, a provisioning protocol carried out between the mobile device and a provisioning server is used to facilitate secure provisioning of both cryptographic credentials and scripts in the mobile device.

The illustrative embodiments advantageously overcome the above-noted drawbacks of conventional approaches to use of cryptographic credentials on mobile communication devices. For example, the illustrative embodiments allow dynamic addition of scripts without compromising security of the cryptographic credentials.

These and other features and advantages of the present invention will become more readily apparent from the accompanying drawings and the following detailed description.

DETAILED DESCRIPTION

The present invention will be described herein with reference to exemplary authentication systems and associated mobile communication devices and other processing devices. It is to be appreciated, however, that the invention is not restricted to use with the particular illustrative system and device configurations shown.

The term "cryptographic credential" as used herein is intended to include an OTP or other type of short-lived authentication credential that is generated using cryptographic techniques, as well as seeds or other long-term secrets utilized in generating an OTP or other type of authentication credential.

Figure 1:
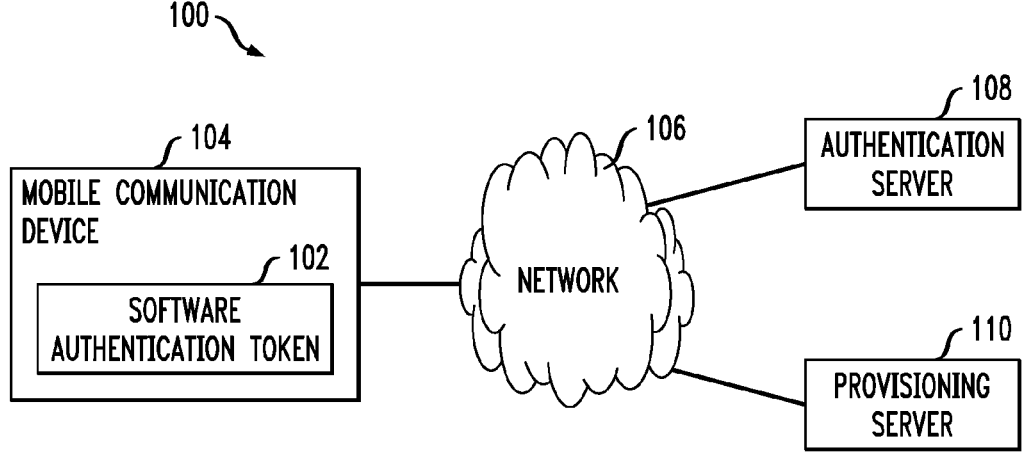
FIG. 1 is a block diagram showing one example of a user authentication system in an illustrative embodiment of the invention.

FIG. 1 shows an example of a user authentication system 100 which includes a software authentication token 102 implemented in a mobile communication device 104. The mobile communication device, also referred to herein as simply a "mobile device," communicates over a network 106 with an authentication server 108 and a provisioning server 110.

The software authentication token 102 may be, for example, a time-based authentication token, an event-based authentication token, a challenge-response token, a hash-chain token, or a hybrid token that incorporates multiple such capabilities, such as a hybrid time-based and event-based token.

The mobile communication device 104 may comprise, for example, a mobile telephone, a laptop computer, a wireless email device, a PDA, or a device that combines functionality associated with multiple such communication devices.

The network 106 may comprise the Internet, a wide area network (WAN), a local area network (LAN), a satellite network, a telephone or cable network, or various portions or combinations of these and other types of networks.

A given server 108 or 110 of the user authentication system 100 may be implemented as a computer or other stand-alone processing platform, or may be distributed over multiple processing platforms comprising multiple separate computers. Numerous other arrangements of one or more servers are possible in the system 100. For example, servers 108 and 110 may be implemented as different portions of a single common processing platform. The mobile communication device 102 and the server 108, 110 are examples of what are more generally referred to herein as "processing devices."

In the system 100, the authentication server 108 is configured as a back-end authentication server, in that it communicates with a mobile communication device 104 over a network, but other types of authentication servers may be used.

A wide variety of conventional authentication processes may be implemented using an authentication token, mobile communication device and authentication server arranged as shown in FIG. 1. Such processes, being well known to those skilled in the art, will not be described in further detail herein. The present invention does not require the use of any particular type of authentication process to authenticate the token to the server.

It is to be appreciated that a given embodiment of the system 100 may include multiple instances of mobile communication device 104, network 106 and servers 108, 110, although only single instances of such elements are shown in the simplified system diagram for clarity of illustration. For example, the system may comprise multiple mobile communication devices that access different sets of servers over different networks.

Figure 2:
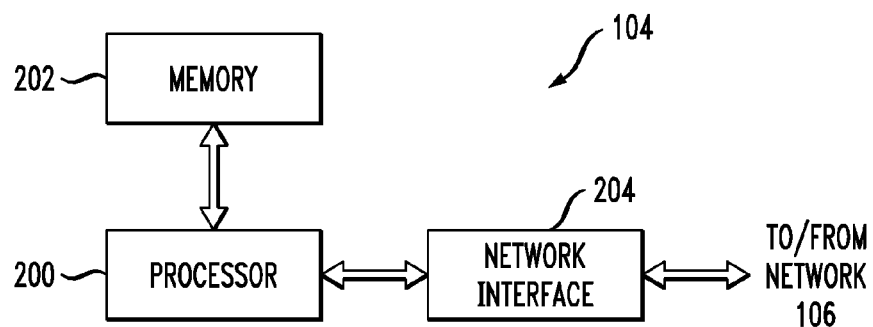
FIG. 2 shows a more detailed view of one possible implementation of a mobile communication device of the FIG. 1 system.

Referring now to FIG. 2, a more detailed illustrative implementation of the mobile communication device 104 is shown. The mobile communication device in this implementation comprises a processor 200 coupled to a memory 202. The processor 200 is also coupled to interface circuitry comprising network interface 204 that is utilized for communicating in a conventional manner with the network 106.

The processor 200 may comprise, for example, a conventional microprocessor, microcontroller, digital signal processor, application-specific integrated circuit (ASIC) or other type of circuitry, as well as portions or combinations of such circuitry elements.

The memory 202 may comprise, for example, electronic memory such as random access memory (RAM) or read-only memory (ROM), magnetic or optical disks, or any other types of storage devices, in any combination.

As will be appreciated by those skilled in the art, portions of a provisioning process in accordance with an embodiment of the invention can be implemented at least in part in the form of one or more software programs that are stored at least in part in memory 202 and executed by processor 200. For example, one or more of the mobile communication device elements to be described in conjunction with FIG. 4 may be implemented at least in part in the form of software that is stored in the memory 202 and executed by the processor 200. One skilled in the art would be readily able to implement such software given the teachings provided herein. The memory 202 is an example of what is more generally referred to herein as a "processor-readable storage medium."

Figure 3:
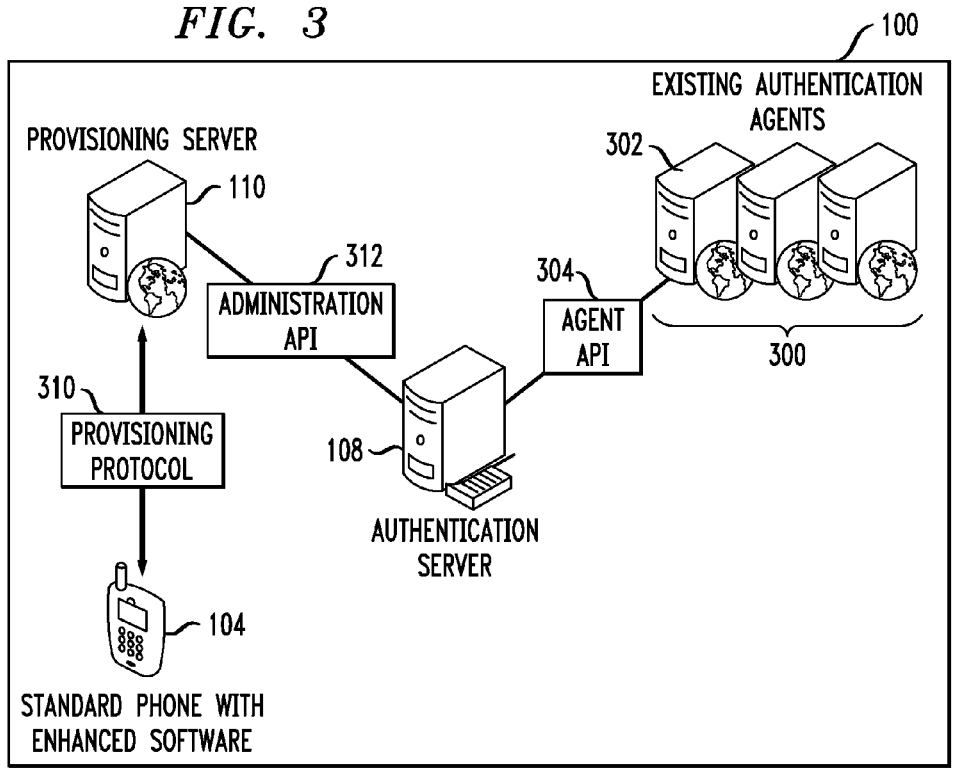
FIG. 3 shows a more detailed view of one possible implementation of the FIG. 1 system.

FIG. 3 shows a more detailed view of the system 100 in an illustrative embodiment. In this embodiment, the mobile communication device 104 is implemented as an otherwise standard mobile telephone with enhanced software as described herein. The authentication server 108 interacts with a set 300 of existing authentication agents 302 via an agent application programming interface (API) 304. The mobile communication device carries out a provisioning protocol 310 with the provisioning server 110. The provisioning server 110 interacts with the authentication server 108 via an administrative API 312.

The system architecture shown in FIG. 3 is an example of what is referred to herein as a mobile secure credential architecture (MSCA). As will be described, this architecture advantageously allows secure use of cryptographic credentials in mobile communication devices in the presence of dynamic addition of scripts.

This particular MSCA more particularly provides the following features in system 100 as shown in FIG. 3:

1. Secure provisioning of cryptographic credentials.
2. Secure provisioning of programs ("scripts") that utilize the credentials.
3. Storage of the credentials and properties related to the credentials in a secure hardware environment of the mobile device.
4. Installation of scripts in the secure hardware environment.
5. An ability to authorize ("endorse") scripts to access and use certain credentials.
6. A programmatic interface that allows applications outside of the secure hardware environment to execute scripts that are endorsed to make use of the credentials, and to query the secure hardware environment about installed credentials and their properties.

Alternative embodiments of the invention may utilize an MSCA that includes only a subset of the above-listed features. Also, other embodiments may use different arrangements of servers or other processing devices.

The authentication agents 302, agent API 304 and administrative API 312 can be implemented using well-known conventional techniques, and their operation is therefore not further described herein.

The provisioning protocol 310 utilized in system 100 as shown in FIG. 3 may be, for example, a protocol known as CT-KIP. See M. Nyström, "The Cryptographic Token Key Initialization Protocol (CT-KIP)," IETF RFC 4758, November 2006, which is incorporated by reference herein. Other provisioning protocols may be used to implement MSCA in alternative embodiments.

In one example of a CT-KIP implementation of MSCA, the provisioning server 110 may be implemented in Java in the form of a Servlet following the Java 2.3 specification. The Servlet itself may run in another Java component, such as the Apache Software Foundation's TomCat Servlet container. The provisioning server needs to communicate with a user account database via the authentication server 108 in order to create seeds and register device IDs (e.g., hash of device certificates). A separate CT-KIP provisioning client is implemented on the mobile device 104, e.g., as an application for the mobile device's native operating system. In operation, the CT-KIP client essentially provides a uniform resource indicator (URI), user ID and password to the provisioning server 110.

Figure 4:
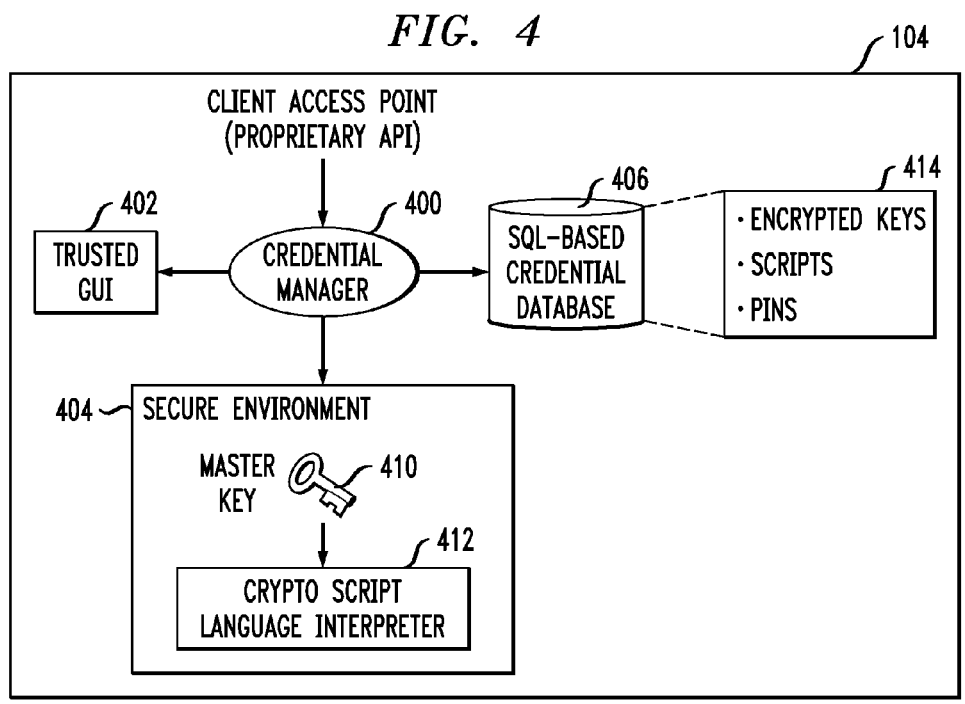
FIG. 4 illustrates the interaction of various elements of a mobile communication device in an illustrative embodiment.

FIG. 4 shows the mobile communication device 104 as configured to implement the above-noted enhanced software associated with the MCSA. The mobile device in this embodiment comprises a credential manager 400 that interacts with a trusted graphical user interface (GUI) 402, a secure hardware environment 404, and a credential database 406. The secure hardware environment comprises a master key 410 that is utilized by a cryptographic script language interpreter 412. The credential database in this embodiment is a structured query language (SQL) based database that stores information 414 illustratively comprising, for example, encrypted keys, scripts and personal identification numbers (PINs).

The credential manager 400 is accessed via a client access point that may be implemented using a proprietary API, that is, a non-standard API. Other types of APIs may be used in providing a client access point to the credential manager.

The secure hardware environment 404 may be implemented using techniques similar to those utilized to implement a "trusted boot" feature in a conventional mobile communication device. For example, designated portions of the processor 200 and memory 202 of FIG. 2 may be configured in a straightforward manner to provide a secure hardware environment.

It should be noted that only the master key 410 resides in the secure hardware environment 404. All other keys are encrypted by the master key and stored in the SQL-based credential database 406.

The trusted GUI 402 is configured to support user input of key protection data (e.g., PINs). To make it possible for a user to separate the trusted GUI from spoofed dialogs, the trusted GUI may contain user-specific items (e.g., icons). An advantage of using a trusted GUI is that it runs as a system process, such that PINs are not handled by applications. This provides increased resistance to attack.

The MSCA in the present embodiment utilizes the language interpreter 412 running in the secure hardware environment 404 to allow dynamic addition of scripts to the mobile communication device 104. The language interpreter is able to execute newly installed scripts written in conformance with a supported cryptographic script language and other constraints. For example, one such script may comprise an OTP algorithm that serves as the basis for the software authentication token 102. A more detailed example of an OTP algorithm script of this type will be provided below. The OTP algorithm script executes in the secure hardware environment, and thus has a high level of security, comparable to that associated with typical hardware authentication tokens.

Secrets and other cryptographic credentials need to be securely provisioned to the secure hardware environment 404. This means that the provisioning process must protect against eavesdroppers as well as modifications to the data in transit. This is achieved in the present embodiment by utilizing a device-specific public key to encrypt a root key for secrets. The root key is also referred to herein as a "base key." The private key corresponding to the public key resides in the secure hardware environment of the device and is known only to the device. The private and public key pair may be, for example, an RSA key pair. Once the base key has been provided to the device, further credentials can be provisioned securely encrypted with the base key or keys derived from the base key. To protect against modifications, a cryptographic checksum using a key derived from the base key can be added to each transfer of secrets. Groups of cryptographic credentials can be identified using an appropriate "family" identifier.

In addition to the credentials themselves, properties relating to the use of the credentials may be stored in the secure hardware environment 404 or in the credential database 414, encrypted with the master key. Such properties include, but are not limited to, the lifetime of the credential, any authorization code (e.g., PIN) required by the user before access to the credential is given, etc.

Script provisioning in the mobile communication device 104 will now be described in greater detail. In the typical case, the scripts that are to execute in the secure hardware environment 404 are not themselves confidential. Such scripts can therefore be transferred in an un-encrypted form, although integrity protection and authenticity may still be required to ensure that a given script is not modified in transit and that the source of the script can be trusted. However, there may be cases when scripts themselves are confidential, for example, when the algorithm implemented by the script is a trade secret. When there is a need to provision such a script to the secure hardware environment, the provisioning process should, like the process for provisioning of secrets, protect against passive and active attackers.

Accordingly, a device public key may be used to wrap a root key for a set of scripts, also referred to as a family of scripts, in a manner similar to the case of cryptographic credential provisioning. The script provisioning root key will in the typical case be different from the cryptographic credential root key since the entity responsible for script provisioning may well be different from the entity responsible for credential provisioning. Once this root key has been provided to the secure hardware environment 404, the actual scripts may be transferred in encrypted form (e.g., using a key derived from the root key). For integrity protection, a cryptographic checksum may be used (e.g., a checksum using a key derived from the root key). The actual key used to encrypt the scripts may be the same across many installations or unique for each device. The key may even be the same key as is used to protect secrets that are to be provisioned to the device, although that may complicate the situation when the entity provisioning secrets is separate from the entity provisioning scripts. Groups of scripts can be identified using a family identifier. This can be especially useful when several scripts need to access the same credential, as will be described in greater detail below. Further, to allow only certain versions of scripts access to credentials it is also possible to encode such information in the transfer of scripts.

As indicated above, the MSCA in the present embodiment includes a script authorization feature, providing an ability to authorize scripts to access and use certain credentials. Typically, one does not want any script executing in the secure hardware environment 404 to have access to any credential, as this for example could result in malicious scripts disclosing the values of certain secrets. The present embodiment stops such attacks using a technique referred to herein as "script endorsement." An endorsement is issued by the issuer of a cryptographic credential and indicates that the credential issuer trusts a particular script to access the credential. For example, the endorsement could take the form of a message authentication code (MAC) as follows:

Endorsement=MAC (K_E, HASH(script))

where K_E is an endorsement key derived from the base key that was used, directly or indirectly, to transfer the secret to the mobile device 104. Upon receiving this endorsement, the secure hardware environment will know that the credential issuer trusts the given script to access the provisioned secret. Further variations are possible, e.g., to handle script versions or families of scripts or any combinations thereof. Another such variation would be to identify scripts that are allowed access to a particular credential by some other property such as having a signature on the script made by a trusted entity. The trusted entity does not have to be the script issuer.

To identify the script, the endorser could send the hash of the script along with the MAC. Other variations are to send the encrypted hash of the script, or the hash of the encrypted script. The latter could be useful if there is a fear that another script could be created with the same hash as the original one.

In other embodiments of the invention, script endorsements could be from authorized parties other than a credential issuer.

The manner in which installed credentials and scripts are utilized in the system 100 will now be described. Once scripts and credentials for a particular application have been installed in the secure hardware environment 404, and the scripts have been endorsed by the credential issuer to access the credentials, applications may start to use those scripts. As an example, an application that is written to emulate a hardware authentication token can call the script implementing the above-noted OTP algorithm and indicate a credential to be used for calculating the next OTP.

The communication between the secure hardware environment 404 and the applications will occur over a programmatic interface. As mentioned previously, the interface may also allow the application to query the secure hardware environment about existing credentials and scripts, properties of the credentials, and similar information. Preferably, the programmatic interface should adhere to an open standard such as RSA Laboratories' Cryptographic Token Interface (PKCS #11) or a similar standard. This use of a standard interface facilitates application development.

Another aspect concerns authorization of users to access certain credentials through the applications. Typically, users may be required to show knowledge of a PIN or some short passphrase before access is granted. By placing such functionality inside the secure environment 404, the risk of malicious code intercepting the user's PIN entry is substantially reduced. The programmatic interface therefore also needs to be able to handle PIN setting, etc. In other cases applications may need to cache PIN information (e.g., due to user experience considerations) and the interface may therefore also need to handle these variants. The above-mentioned PKCS #11 interface includes basic PIN management support.

The SQL-based credential database 406 may be configured to store not only keys (e.g., secrets) and scripts (e.g., algorithms), but also key properties such as key lifetime and algorithm-specific constants. This is advantageous in that key-using applications are relieved from hosting properties in separate databases. It also facilitates key management since when a key is updated or deleted all associated data (e.g., properties) are affected as well. The database may also be used for hosting registration information provided by external key-using applications. This makes the provisioning process more flexible without requiring constant updates due to new scripts. The external key-using applications can self-register their need for specific properties and/or protocol extension objects, typically indicated by URIs. As a result, the provisioning process need not be aware of extensions and their interpretation in advance since this part can be off-loaded to the registered applications. Another way of addressing the extension issue is to configure external key-using applications to extend the code of the provisioning application with tailor-made extensions objects.

Device certificates are used in the illustrative embodiments to encrypt returned secrets and to keep track of provisioned devices. The latter usage may seem odd given the fact that we do not actually authenticate devices. However, based on the assumption that a device is unique (e.g., bit-wise) with a very high probability you can indeed treat device certificates as GUIDs. Here we rule out bad vendors who clone certificates etc., because their malpractice will not affect the good vendors. A persistent device certificate can contribute to OTP provisioning robustness by eliminating issuance of multiple tokens to the same device and user. This may be important when multiple (e.g., redundant) tokens per device lead to server failures due to limits of the number of OTP tokens/user for authentication performance reasons.

Example OTP Algorithm Script

An example of a script of an OTP algorithm that may be utilized to implement software authentication token 102 in mobile device 104 is given below. The particular algorithm is exemplary only, and a wide variety of other types of algorithms may be used in other embodiments.

Core OTP Algorithm

```
j=1
while j<12 do
  j=j+1
  if j==6 then
  j=8
  end
  m=k
  i=0
  while i<2 do
  k[i+4]=s[i]
  i=i+3
  end
  i=0
  while i<8 do
  k[i]=t[i]
  i=i+1
  end
  i=j
  while i<12 do
  y=i/2
  v=170
  f=64290
  if (i& 1)==0 then
    v=42520
    f=254
  end
  k[y]=k[y]|v
  k[y]=k[y]& f
  i=i+1
  end
  i=5
```

```
while i<8 do
    k[i]=44059
    i=i+1
end
#aes_enc (n, m, k, k)
end
```

The #aes_enc is a type of macro that calls a pre-defined function. In addition to a small set of core cryptographic functions, the secure hardware environment needs to support input-output (I/O) functionality as well. However, in this example I/O is assumed to be entirely stream-based so the programmer must work with conventions such as the first 8 words of the credential script input being the seed.

Example CT-KIP Exchanges

In order to support the exemplary MSCA implementations described above, a number of CT-KIP extension objects have been defined. Below is an example of a request and response in accordance with provisioning protocol 310 using CT-KIP. The request is generated by the CT-KIP client running on mobile device 104 and is sent by the mobile device to the provisioning server 110. The response is sent by the provisioning server back to the CT-KIP client running on the mobile device. Note that the MSCA system in this example uses a two-pass version of CT-KIP.

```
Request:
<?xml version="1.0"encoding="UTF-8"?>
<ct-kip:ClientHello Version="1.0"
xmlns:ct-kip="http://www.rsasecurity.com/rsalabs/otps/schemas/2005/12/ct-kip#"
xmlns:ct-kip-msca="http://www.rsasecurity.com/rsalabs/otps/schemas/2007/09/ct-kip-msca#"
xmlns:ct-kip-two-pass="http://www.rsasecurity.com/rsalabs/otps/schemas/2006/05/ct-kip-two-pass#"
xmlns:ds="http://www.w3.org/2000/09/xmldsig#"
xmlns:xsi="http://www.w3.org/2001/XMLSchema-instance">
    <SupportedKeyTypes>
        <Algorithm>http://www.rsasecurity.com/rsalabs/otps/schemas/2005/09/otps-wst#SecurID-
AES</Algorithm>
    </SupportedKeyTypes>
    <SupportedEncryptionAlgorithms>
        <Algorithm>http://www.w3.org/2001/04/xmlenc#rsa-1_5</Algorithm>
    </SupportedEncryptionAlgorithms>
    <SupportedMACAlgorithms>
        <Algorithm>http://www.rsasecurity.com/rsalabs/otps/schemas/2005/12/ct-kip#ct-kip-prf-
aes</Algorithm>
    </SupportedMACAlgorithms>
    <Extensions>
        <Extension xsi:type="ct-kip-two-pass:TwoPassSupportType">
            <SupportedKeyInitializationMethod>http://www.rsasecurity.com/rsalabs/otps/schemas/2007/09/ct-
kip#transport-obc</SupportedKeyInitializationMethod>
            <Payload xsi:type="ds:KeyInfoType">
                <ds:X509Data>
                    <ds:X509Certificate>MIIC4TCCAcm ... Ncvmif</ds:X509Certificate>
                </ds:X509Data>
            </Payload>
        </Extension>
        <Extension xsi:type="ct-kip-msca:MSCAUserAuthType">
            <UserID>yoda</UserID>
            <Password>1234</Password>
        </Extension>
    </Extensions>
</ct-kip:ClientHello>
```

In the request above, sent from the client implemented in mobile device 104, the following data is delivered to the provisioning server 110:

1. The OTP algorithm(s) that the client supports.
2. The encryption algorithm(s) used for payload encryption that the client supports.
3. The message authentication method(s) used for verifying message integrity that the client supports.
4. That it uses the two-pass version of CT-KIP.
5. How keys are actually packaged. In this case it is an MSCA-specific method.
6. The device certificate.
7. User authentication information.

```
Response:
<?xml version="1.0"encoding="UTF-8"?>
<ct-kip:ServerFinished Status="Success" Version="1.0"
xmlns:ct-kip="http://www.rsasecurity.com/rsalabs/otps/schemas/2005/12/ct-kip#"
xmlns:ct-kip-msca="http://wvvw.rsasecurity.com/rsalabs/otps/schemas/2007/09/ct-kip-msca#"
xmlns:ct-kip-two-pass="http://www.rsasecurity.com/rsalabs/otps/schemas/2006/05/ct-kip-two-pass#"
xmlns:ds="http://www.w3.org/2000/09/xmldsig#"
xmlns:xenc="http://www.w3.org/2001/04/xmlenc#"
xmlns:xsi="http://www.w3.org/2001/XMLSchema-instance">
```

-continued

```
<TokenID>MDAwMDIwNjgxNjQ3</TokenID>
<KeyID>AAECAwQFBg==</KeyID>
<KeyExpiryDate>2009-12-28T11:54:06-05:00</KeyExpiryDate>
<ServiceID>RSA Test Server</ServiceID>
<UserID>yoda</UserID>
<Extensions>
   <Extension xsi:type="ct-kip-two-pass:KeyInitializationDataType">
      <KeyInitializationMethod>http://www.rsasecurity.com/rsalabs/otps/schemas/2007/09/ct-
kip#transport-obc</KeyInitializationMethod>
      <Payload xsi:type="ct-kip-msca:MSCA PayloadType">
         <MSCAInitData Type="http://www.rsasecurity.com/rsalabs/otps/schemas/2005/09/otps-
wst#SecurID-AES">
            <xenc:EncryptionMethod Algorithm="http://www.w3.org/2001/04/xmlenc#rsa-1_5"/>
            <ds:KeyInfo>
               <ds:X509Data>
                  <ds:X509Certificate>MIIC4TCCAcm ... Ncvmif</ds:X509Certificate>
               </ds:X509Data>
            </ds:KeyInfo>
            <xenc:CipherData>
               <xenc:CipherValue>CtOFmNio ... G+6I+1e4=</xenc:CipherValue>
            </xenc:CipherData>
         </MSCAInitData>
         <MSCAXferData>V5IFrFCW ... wHrG1Bp7tA=</MSCAXferData>
         <MSCAEndorseData>5O3aeaTB ... Vg7zPTjz/it0=</MSCAEndorseData>
         <MSCAScriptData>QjLtV4tK7E ... c5LvYxDh2</MSCAScriptData>
      </Payload>
   </Extension>
   <Extension xsi:type="ct-kip:OTPKeyConfigurationDataType">
      <OTPFormat>Decimal</OTPFormat>
      <OTPLength>8</OTPLength>
      <OTPMode>
         <Time/>
      </OTPMode>
   </Extension>
</Extensions>
<Mac MacAlgorithm="http://www.rsasecurity.com/rsalabs/otps/schemas/2005/12/ct-kip#ct-kip-prf-aes"
   Nonce="40" xsi:type="ct-kip-two-pass:ExtendedMacType">AAECAwQFBg==</Mac>
</ct-kip:ServerFinished>
```

In the response above, sent from the provisioning server 110 to the client implemented in the mobile device 104, the following data is delivered to the client:

1. Issued OTP credential attribute and configuration information.
2. A master key package used to decipher the other packages.
3. The seed in an MSCA package.
4. An endorse package that ties a seed to a script (e.g., algorithm).
5. The encrypted script. This would ideally be provisioned conditionally but was not in the illustrative embodiment described above.
6. The message authentication code used for verifying message integrity.

The illustrative MSCA embodiments described herein advantageously overcome the drawbacks of conventional approaches to use of cryptographic credentials on mobile communication devices. For example, the illustrative embodiments allow dynamic addition of scripts operating on cryptographic credentials without compromising security of the cryptographic credentials themselves.

The MSCA embodiments as described above also provide significant advantages over conventional techniques such as trusted platform modules (TPMs), which typically have only a fixed set of low-level cryptographic primitives and no ability to run code. MSCA is much simpler than TPMs but in certain of the described embodiments may be slightly less secure (e.g., when PINs are not handled by a trusted GUI or otherwise not protected by the secure hardware environment). It is to be appreciated, however, that this is not an intrinsic limitation of the MSCA, and thus other embodiments may be configured to provide a higher level of security than TPMs. Furthermore, MSCA is a more practical approach to mobile device security than a system depending on complex APIs and PKI structures.

A given embodiment of the present invention may be implemented in the form of one or more servers, mobile devices, or other processing devices. For example, a system configured in accordance with an embodiment of the invention may comprise multiple processing devices which are interconnected over one or more networks, such as the Internet or other types of networks in any combination. A given such processing device will generally include at least one processor and at least one memory. The one or more memories can be used to store program code for implementing at least a portion of at least one of the techniques described above, with such program code being executed by the processor(s) of the processing device. Conventional aspects of such processing devices as configured to support cryptographic applications are well known, and those skilled in the art will be able to modify these devices in a straightforward manner to implement the techniques disclosed herein.

The above-described embodiments of the invention are presented for purposes of illustration only. Many variations and other alternative embodiments may be used. For example, although described in the context of particular system and device configurations, the techniques are applicable to a wide variety of other types of authentication systems and associated devices. In addition, the various simplifying assumptions made above in the course of describing the illustrative embodiments should also be viewed as exemplary rather than as requirements or limitations of the invention.

Numerous other alternative embodiments within the scope of the appended claims will be readily apparent to those skilled in the art.

What is claimed is:

1. A method for use in a mobile communication device having a secure hardware environment, comprising:
   configuring the mobile communication device to store a cryptographic credential within the secure hardware environment;
   provisioning a script for execution in the mobile communication device, the script comprising program code that executes at least in part within the secure hardware environment and is configured to utilize the cryptographic credential stored within the secure hardware environment; and
   prior to permitting the script to access the cryptographic credential, verifying in the secure hardware environment an endorsement of the script, the endorsement being provided by an issuer of the cryptographic credential.

2. The method of claim 1 wherein the cryptographic credential stored in the secure hardware environment comprises a long-term cryptographic credential and the script is configured to generate a plurality of short-lived cryptographic credentials based on the long-term cryptographic credential.

3. The method of claim 2 wherein the script implements a one-time password (OTP) algorithm of a software authentication token.

4. The method of claim 1 wherein the endorsement comprises a message authentication code generated as a function of at least a portion of the script and an endorsement key.

5. The method of claim 4 wherein the endorsement key is generated from a base key utilized in configuring the mobile communication device to store the cryptographic credential in the secure hardware environment.

6. The method of claim 4 wherein the message authentication code is generated as a function of a hash of at least a portion of the script.

7. The method of claim 1 wherein the endorsement comprises one of a hash of the script, an encrypted hash of the script and a hash of an encrypted version of the script.

8. The method of claim 1 wherein the endorsement is based on one or more designated script properties so as to support endorsement of a plurality of related scripts.

9. The method of claim 1 wherein the verifying step is performed by a script language interpreter in the secure hardware environment.

10. The method of claim 1 further including the steps of:
    decrypting an encrypted version of the script utilizing a first base key previously provided to the mobile communication device; and
    decrypting an encrypted version of the cryptographic credential using a second base key previously provided to the mobile communication device;
    said second base key being independent of said first base key.

11. The method of claim 10 wherein the second base key is further utilized to process endorsements of scripts that utilize the cryptographic credential.

12. The method of claim 10 further including the step of obtaining a given one of the base keys by decrypting a received encrypted version of the given base key in which the given base key is encrypted using a device-specific public key.

13. The method of claim 10 further comprising the step of confirming a cryptographic checksum generating using an additional key derived from a given one of the base keys.

14. The method of claim 2 further comprising the step of storing, in a credential database of the mobile communication device that is external to the secure hardware environment, registration information provided by one or more applications that execute on the device and utilize the short-term cryptographic credentials generated by the script.

15. The method of claim 14 wherein the registration information stored in the credential database comprises information characterizing protocol capabilities of the applications.

16. The method of claim 1 wherein at least one of the cryptographic credential and the script is provisioned to the mobile communication device utilizing a Cryptographic Token Key Initialization Protocol (CT-KIP) provisioning protocol where a client portion of said protocol is implemented in the mobile communication device.

17. A non-transitory processor-readable storage medium having executable instructions embodied therein for implementing the steps of the method of claim 1.

18. A mobile communication device comprising:
    a processor coupled to a memory; and
    a network interface configured to allow the device to communicate over a network;
    wherein the mobile communication device further comprises a secure hardware environment configured to store a cryptographic credential;
    the mobile communication device being configured for provision of a script for execution in the mobile communication device, the script comprising program code that executes at least in part within the secure hardware environment and is configured to utilize the cryptographic credential stored within the secure hardware environment;
    the mobile communication device being further configured such that, prior to permitting the script to access the cryptographic credential, an endorsement of the script is verified in the secure hardware environment, the endorsement being provided by an issuer of the cryptographic credential.

19. The mobile communication device of claim 18 wherein the secure hardware environment is implemented in designated portions of said processor and said memory.

20. The mobile communication device of claim 18 wherein said device comprises:
    a credential manager interfacing with a client side of a provisioning protocol; and
    a credential database outside of the secure hardware environment;
    the credential manager being configured for communication with the secure hardware environment and the credential database.

21. The mobile communication device of claim 20 wherein the secure hardware environment is configured to store a master key associated with the cryptographic credential and the credential database is configured to store one or more additional keys encrypted using the master key.

22. The mobile communication device of claim 18 wherein the secure hardware environment comprises a script language interpreter configured to verify the endorsement prior to permitting the script to access the cryptographic credential.

23. A system comprising:
    at least one provisioning server adapted for communication with a plurality of mobile communication devices;
    a given one of the mobile communication devices being configured to store a cryptographic credential within a secure hardware environment of said device;
    the provisioning server being configured to supply the given mobile communication device with a script for execution in that mobile communication device, the script comprising program code that executes at least in part within the secure hardware environment and is configured to utilize the cryptographic credential stored within the secure hardware environment;

wherein the provisioning server is further configured to supply the given mobile communication device with an endorsement of the script, the endorsement being provided by an issuer of the cryptographic credential.

24. The system of claim 23 further comprising an authentication server adapted for communication with the provisioning server.

* * * * *